United States Patent [19]
Kellum et al.

[11] Patent Number: 5,965,675
[45] Date of Patent: *Oct. 12, 1999

[54] POLYMERIZATION PROCESSES

[75] Inventors: Gene E. Kellum; Robert L. Batchelor, both of Orange, Tex.

[73] Assignee: Chevron Chemical Company, San Ramon, Calif.

[ * ] Notice: This patent is subject to a terminal disclaimer.

[21] Appl. No.: 08/857,426

[22] Filed: May 16, 1997

Related U.S. Application Data

[63] Continuation-in-part of application No. 08/566,453, Dec. 1, 1995, abandoned.

[51] Int. Cl.[6] ....................................................... C08F 2/38
[52] U.S. Cl. .................................. 526/82; 526/84; 526/88; 526/91; 526/95; 526/96; 526/100; 526/101; 526/106
[58] Field of Search ................................. 526/82, 84, 88, 526/91, 95, 96, 100, 101, 106

[56] References Cited

U.S. PATENT DOCUMENTS

| | | | |
|---|---|---|---|
| 4,559,394 | 12/1985 | McDaniel | 526/106 |
| 5,066,736 | 11/1991 | Dumain et al. | 526/82 |
| 5,155,186 | 10/1992 | Hogan et al. | 526/106 |

*Primary Examiner*—Peter D. Mulcahy
*Attorney, Agent, or Firm*—Marianne H. Michel; W. Bradley Haymond

[57] ABSTRACT

A polymerization process is provided comprising contacting under polymerization conditions a catalyst, a taming agent, ethylene and optionally a comonomer, wherein the catalyst comprises chromium oxide, titanium oxide and an inorganic refractory oxide, wherein the taming agent is selected from the group consisting of water, alcohols, aldehydes, ketones, esters, and organic acids and mixtures thereof. The process is especially suited for polymerizing ethylene resins suitable for blow molding use.

21 Claims, No Drawings

POLYMERIZATION PROCESSES

This application is a continuation-in-part of application U.S. Ser. No. 08/566,453 filed Dec. 1, 1995 now abandoned.

The present invention relates to the polymerization of ethylene using a chromium/titanium-containing catalyst, and to the production of polyethylene resins suitable for blow molding resins.

BACKGROUND OF THE INVENTION

The polymerization of ethylene and ethylene copolymers using various methods and catalysts is known in the art. For blow molding applications, it is important for the polyethylene resin to exhibit a relatively high melt flow ratio. Melt flow ratio as used herein is the ratio of high load melt index to melt index. The melt index in g/10 min. at 190° C. is run according to ASTM method D-1238 65T using a weight of 2.16 kg. The high load melt index in g/10 min. at 190° C. is run according to ASTM method D-1238 65T using a weight of 21.6 kg.

Melt flow ratios can be increased by various compounding methods. However, these methods increase the final cost of the resin, require additional steps and adversely affect certain desired properties of the resin.

It would therefore be desirable to provide a simple economical polymerization process capable of preparing ethylene homopolymers and copolymers having a high melt flow ratio while still maintaining other desired properties.

SUMMARY OF THE INVENTION

It is thus an object of the present invention to provide a simple economical polymerization process which produces ethylene polymers having a relatively high melt flow ratio.

It is another object of the present invention to provide a polymerization process for preparing ethylene polymers suitable for blow molding applications.

According to the present invention, a polymerization process is provided comprising contacting under polymerization conditions a catalyst, a taming agent, ethylene and optionally an olefin comonomer, wherein the catalyst comprises chromium oxide, titanium oxide and an inorganic refractory oxide, wherein the taming agent is selected from the group consisting of water, alcohols, aldehydes, ketones, esters, and organic acids and mixtures thereof. The process is especially suited for polymerizing ethylene to produce resins suitable for blow molding use.

DETAILED DESCRIPTION

The taming agent used in the process of the present invention is selected from the group consisting of water, alcohols, esters, aldehydes, ketones, and organic acids and mixtures thereof. Preferably, the taming agent is water, an alcohol, or an ester. It is also within the scope of the invention to employ oxygen as a taming agent in combination with the above defined taming agents.

Suitable alcohols generally contain from 1 to 12 carbon atoms and include methanol, ethanol, n-propanol, isopropanol, butanol, amyl alcohol, hexanol, and others and mixtures thereof.

Suitable esters generally contain from 1 to 12 carbon atoms and include methyl formate, ethyl formate, methyl acetate, ethyl acetate, n-propyl acetate, n-butyl acetate, n-amyl acetate, methyl propanoate, methyl butanoate, ethyl ethanoate, and others and mixtures thereof.

Suitable aldehydes generally contain from 1 to 12 carbon atoms and include formaldehyde, acetaldehyde, propionaldehyde, n-butyralaldehyde, isobutyralaldehyde, α-methylbutyraldehyde, and others and mixtures thereof.

Suitable ketones generally contain from 1 to 12 carbon atoms and include acetone, ethyl methyl ketone, methyl isobutyl ketone, 3-pentanone, 3-hexanone, cyclopentanone, cyclohexanone and others and mixtures thereof.

Suitable organic acids generally contain from 1 to 12 carbon atoms and include formic acid, acetic acid, propionic acid, n-butanoic acid, isobutanoic, pentanoic acid and hexanoic acid and others and mixtures thereof.

The amount of taming agent employed can vary broadly depending on the particular taming agent, reactants, reaction conditions employed, and desired results. Preferably, the amount of taming agent is adjusted in combination with the catalyst and product properties desired.

Generally, the taming agent is present in an amount in the range of from about 0.01 mole to about 10 moles taming agent per million moles of fresh ethylene feed, preferably from 0.01 mole to 5 moles, and more preferably from 0.01 mole to 3 moles taming agent per million moles of fresh ethylene feed. The term "fresh" ethylene feed is used to distinguish from the total ethylene feed to the reaction zone, which includes fresh, as well as recycle ethylene.

The catalyst used in the process of the present invention contains a catalytic amount of chromium. A "catalytic amount" as used herein is the amount necessary to polymerize ethylene. Generally, the chromium will be present in an amount greater than about 0.1 weight percent based on the total catalyst weight, preferably in the range of from about 0.1 weight percent chromium to about 10 weight percent, more preferably in the range of from about 0.1 to about 8 weight percent, and most preferably in the range of from 0.2 to 6 weight percent. The weight percent chromium is given as the element.

Chromium compounds used in preparing the catalyst can be selected from various organic or inorganic forms of chromium. The preferred chromium compounds, which are used to prepare the catalysts for use in the process of the present invention, are those which contain in addition to chromium, only oxygen, and thermally degradable or volatile substituents, such as, for example, is the case with chromium acetate. Chromium compounds, such as chromium acetate and chromium trioxide, are two preferred sources for the chromium.

Titanium in the catalyst will be present in an amount sufficient to increase the melt index ratio of the polymer produced. Generally, the titanium will be present in an amount greater than about 0.1 weight percent based on the total catalyst weight. Preferably, the titanium content of the catalyst is in the range of from about 0.1 to about 10 weight percent, preferably in the range of from about 0.1 to about 8 weight percent, and more preferably in the range of from 0.2 to 6 weight percent. The weight percent titanium is given as the element.

Various titanium compounds can be used to prepare the catalysts. Suitable titanium compounds include titanium oxides such as titanium tetramethoxide, titanium tetraethoxide, titanium n-tetrapropoxide, titanium tetraisopropoxide titanium tetra-n-butoxide and titanium isobutoxide. Excellent results have been obtained with titanium tetraisopropoxide and it is preferred.

As indicated above, an important aspect of the present invention is the attainment of higher melt flow ratio, using the taming agent with a chromium and titanium catalyst, than would be achieved without the taming agent or without the titanium. The melt flow ratio is the ratio of high load melt index (HLMI) to melt index (MI). MI and HLMI in g/10 min. at 190° C. are determined in accordance with ASTM method D-1238 65T using a weight of 2.16 kg and 21.6 kg, respectively.

Although the melt flow ratio of a polymer can be increased by subsequent compounding, the compounding conditions employed are often sufficiently severe that other properties of the resin are damaged during the process. Low melt flow ratios usually translate into greater processing difficulty in blow molding applications.

Preferably, the amount of taming agent, chromium and titanium employed is sufficient to raise the melt flow ratio of the product off the reactor by at least 2 units, more preferably by at least 5 units, and most preferably by 8 units or more compared to product obtained off the reactor without the taming agent and titanium.

The catalyst contains the foregoing metals on an inorganic refractory oxide, such as silica, silica alumina, zirconia, thoria, etc. Silica is particularly preferred, for example, finely divided silica available from Davison Chemical Company and commonly designated as "952" silica support.

Preferably, the catalyst is prepared by impregnating the chromium compound onto finely divided high surface area, silica support, drying at 200° F. to 450° F. for several hours, then adding the titanium compound and activating in air or other oxygen-containing gas at 800° F. to 1600° F.

Suitable catalysts can be prepared by alternative procedures, for example, by a cogel procedure where, instead of post-titanating the preferred silica base after the base is formed, the titanium and silica are formed together in a cogel procedure.

Catalyst preparation procedures as described in U.S. Pat. No. 3,622,521 can be used in preparing the chromium-titanium catalysts used in the process of the present invention. The disclosure of the '521 patent is incorporated herein by reference.

The taming agent can be combined with the catalyst prior to reacting with the olefin or the taming agent can be injected into the reaction vessel prior to or with the introduction of ethylene. One preferred embodiment is to introduce the taming agent in the recycle gas stream prior to the introduction of the recycle gas into the reactor vessel. Preferably, the taming agent is added in mixture with nitrogen, such as in an amount of 4 to 10% taming agent to 96 to 90% nitrogen. Another preferred embodiment is to adsorb the taming agent onto the catalyst. Another preferred embodiment is to combine the taming agent with a diluent such as isopentane prior to or with the introduction of ethylene.

The taming agent should be effective to reduce the productivity of the catalyst. The productivity of the catalyst is the amount of polyethylene produced per unit weight of fresh catalyst added to the reaction zone. For example, productivity of the catalyst can be measured in terms of pounds of polyethylene produced per hour divided by pounds of fresh catalyst introduced to the reaction zone per hour.

The process of the present invention is especially useful in improving control in carrying out a polymerization process to produce resins, such as blow molding resins, film resins, and other polyethylene resins. The present process employing a taming agent and a catalyst containing chromium oxide and titanium oxide produces polymers having higher and more controllable melt flow ratios.

The polymerization process can be carried out in various types of reactors. Thus, a mechanically stirred reaction zone in a horizontal or vertical reactor can be used or a fluidized bed in a vertically disposed reactor can be used. A fluidized bed is preferred, such as described, for example, in U.S. Pat. No. 4,011,382. The bed of catalyst particles/polyethylene is fluidized by upwardly flowing ethylene gas.

Temperatures and pressures used in the polymerization process of the present invention are those sufficient for the polymerization of ethylene. Generally, polymerization temperatures are in the range of from about 100° F. to about 250° F., preferably in the range of from 150° F. to 250° F. and more preferably in the range of from 190° F. to 230° F. Preferred pressures are below 500 psig, more preferably between 100 and 500 psig, and still more preferably between 150 and 400 psig, and most preferably between 250 and 350 psig.

The feed ethylene preferably is highly purified. Conventional processes can be employed to purify the ethylene, such as by passing the ethylene through beds of copper oxide or lead oxide on alumina, molecular sieves, hydrogenation catalyst or all three of these, to remove impurities, such as oxygen, carbonyl sulfide, carbon monoxide and arsenic, water, and acetylene. Oxygen can be removed by treatment with a supported copper catalyst. Carbon dioxide impurity can be removed by passing the ethylene through a bed of solid caustic. Preferably, the feed ethylene contains no more than 1 ppm, more preferably less than 0.5 ppm, and most preferably less than 0.05 ppm of the foregoing impurities.

The high purity ethylene preferably fed to the process of the present invention can contain nitrogen, for example, 1 to 70 mole percent nitrogen, more preferably 5 to 45 mole percent.

The ethylene can be polymerized to a homopolymer, or to a copolymer using an alpha-olefin containing from 3 to 8 carbon atoms as a comonomer feed. Preferred alpha-olefins comonomers are propylene, butene-1, pentene-1, and hexene-1. When employed, preferred amounts of the comonomer feed are in the range of from 0.01 to 10 mole percent of the total (fresh plus recycle) ethylene feed, more preferably 0.1 to 3 mole percent of the total ethylene feed, and most preferably 0.25 to 2 mole percent of the total ethylene feed.

The process of the present invention is especially useful as applied to blow molding resin production, but is applicable for other end-use areas such as film and pipe. For blow molding resin production, melt flow ratio for the resins as produced off the reactor are generally in the range of from about 75 to about 150 and are dependent upon the Melt Index and end use. Preferably, the melt flow ratio is in the range of from 85 to 150, and most preferably between 90 and 150. Preferably, the melt index of such resins is in the range of from about 0.1 to about 1.0, preferably from 0.1 to 0.75.

EXAMPLES AND FURTHER DESCRIPTION

A preferred catalyst preparation procedure for a catalyst for use in the process of the present invention is as follows. The starting material commonly is a commercially available chromium-silica catalyst, such as the 969MS product available from Davison Chemical Division of W. R. Grace & Co. Suitable silica supports include silica "952", available from Davison. The catalyst starting material preferably has a surface area between 200 and 500 m$^2$/gm, for example, approximately 300 m$^2$/gm and a pore volume between about 1.0 and 2.0 cm$^3$/gm, for example, approximately 1.6 cm$^3$/gm.

The catalyst can be prepared at various chromium levels, preferably at least 0.4 weight percent, preferably between 0.7 and 2.0. For purpose of the present procedure, preferably the catalyst is prepared to contain approximately one weight percent chromium, for example, 0.8 to 1.2 weight percent chromium. The chromium can be impregnated onto silica support using various techniques, for example, chromium acetate can be impregnated onto finely divided silica support.

After impregnating the chromium component onto the catalyst support, the resulting catalyst base is dried in a fluidized bed at about 200 to 400° F., preferably approximately 250° F., for several hours, preferably approximately 4 hours in air, nitrogen, or a mixture of air and nitrogen.

Titanium compound is next added to the dried catalyst base. This can be done in a variety of ways. The titanium compound can be added in various forms, such as titanium ester compounds, preferably, titanium tetraisopropoxide. The dry catalyst base can be slurried in a hydrocarbon, such as isopentane, and then the titanium compound added to it. For example, 25 cm$^3$ of titanium tetraisopropoxide can be slurried with 100 grams of catalyst base and the temperature gradually raised to approximately 113° F. and then held for one-half hour.

Next, the solvent is evaporated by raising the temperature to approximately 158° F. Drying is continued until all of the hydrocarbon is removed and then the catalyst material is cooled to ambient temperature.

Next, the dried, titanium-impregnated catalyst is transferred to a fluidized bed catalyst activator wherein the catalyst is subjected to initial heat treatment at approximately 250° F. under nitrogen, or a mixture of air and nitrogen.

After one hour, the fluidizing gas is changed to air and the temperatures programmed to rise to 1525° F. at a rate of 100° F. increase in temperature per hour. When the temperature reaches 1525° F., the catalyst is held at this temperature for 12 hours. Then the catalyst is cooled to 500° F. At 500° F., the gas is changed to nitrogen and one hour later the catalyst is removed from the activation step.

Because the catalysts are activated in the presence of oxygen at high temperature, it will be understood that the chromium and titanium of the catalyst are present in oxide form in the activated catalyst. However, the oxidation state of the chromium and titanium can change during the ethylene polymerization reaction. Also, it is believed that the chromium and titanium in the catalyst are coordinated to at least some extent with each other, probably through oxygen atoms, and that at least the chromium (and possibly the titanium also) are coordinated with alkyl bonds and/or hydrogen bonds as well as oxygen bonds when the catalyst is in the active form in the ethylene polymerization process. The weight percent chromium and titanium are given herein as the element rather than as the compound, such as chromium oxide or titanium oxide.

Catalysts were prepared using the procedure indicated above, and were tested in polymerization runs at a temperature of from 210° F. to 220° F. The catalysts contained approximately one percent chromium and four percent titanium. The test reactions were conducted in gas phase in a fluidized bed, substantially like the fluidized bed system illustrated in U.S. Pat. No. 4,011,382.

In the Table below:

Taming Agent is the taming agent and the amount employed in $\mu$g/g polyethylene.

MI is the melt index in g/10 min. at 190° C. run according to ASTM method D-1238 65T using a weight of 2.16 kg MFR is the melt flow ratio and is the ratio of high load melt index to melt index. The high load melt index in g/10 min. at 190° C. was determined according to ASTM method D-1238 65T using a weight of 21.6 kg.

Productivity is lbs polyethylene produced per lb catalyst.

TABLE 1

| Run | Taming Agent $\mu$g/g PE | MI | MFR | Productivity lbs PE/lb Cat. |
| --- | --- | --- | --- | --- |
| 101 | None | 0.28 | 82 | 20,000+ |
| 102 | None | 0.35 | 74 | 20,000 |
| 103 | None | 0.41 | 74 | 33,000 |
| 104 | Oxygen 0.2–0.3 | 0.34 | 98 | 16,000 |
| 105 | Oxygen 0.3 | 0.19 | 116 | 13,300 |
| 106 | Oxygen 0.35 | 0.33 | 100 | 12,000 |
| 107 | Water 0.24 | 0.32 | 98 | 16,700 |
| 108 | Water 0.45 | 0.36 | 106 | 10,000 |
| 109 | Water 0.49 | 0.33 | 97 | 9,000 |
| 110 | Water 0.70 | 0.75 | 106 | 6,500 |
| 111 | Water 0.5–0.8 + Oxygen 0.3 | 0.34 | 144 | 5,000 |
| 112 | Ethanol 0.87 | 0.30 | 93 | 11,000 |
| 113 | Ethanol 3.1 | 0.26 | 109 | 10,000 |
| 114 | Ethanol 3.5 | 0.27 | 101 | 10,000 |
| 115 | Ethyl Acetate 2.6 | *0.27 | 107 | 13,000 |
| 116 | Water 0.2–0.3 | 0.41 | 101 | 14,300 |
| 117 | Water* 0.2–0.3 | 0.29 | 98 | 19,600 |
| 118 | Water* 0.3–0.4 | 0.43 | 107 | 12,000 |
| 119 | Water* 0.4–0.5** | 0.52 | 110 | 10,000 |
| 120 | Water* 0.2–0.3 + Oxygen 0.35 | 0.30 | 135 | 7,700 |
| 121 | Water* 0.4–0.5 + Oxygen 0.3 | 0.68 | 109 | 5,500 |

*Water adsorbed on catalyst
**Estimated from amount of water added to catalyst and productivity values.

The results in the Table above indicate that polymerizations conducted in the presence of a taming agent employing a chromium/titanium-containing catalyst produced a higher melt flow ratio than those with no taming agent.

What is claimed is:

1. A polymerization process comprising contacting under polymerization conditions a catalyst, a taming agent, ethylene and optionally an olefin containing from 3 to 8 carbon atoms:

wherein the catalyst comprises chromium oxide, titanium oxide and an inorganic refractory oxide;

wherein the taming agent is selected from the group consisting of water, aldehydes, ketones, esters, organic acids, methanol, ethanol, n-propanol, isopropanol, butanol, amyl alcohol, hexanol and mixtures thereof; and wherein the taming agent is present in an amount sufficient to achieve a melt flow ratio of at least 75 units and a melt index from 0.1 to 1.0 units.

2. A process in accordance with claim 1 wherein the taming agent is present in an amount in the range of from about 0.01 mole to about 10 moles per million moles of fresh ethylene.

3. A process in accordance with claim 2 wherein the taming agent is present in an amount in the range of from 0.01 mole to 8 moles per million moles of fresh ethylene.

4. A process in accordance with claim 3 wherein the taming agent is present in an amount in the range of from 0.01 mole to 5 moles per million moles of fresh ethylene.

5. A process in accordance with claim 1 wherein the taming agent is water, an alcohol, or an ester.

6. A process in accordance with claim 5 wherein the taming agent is water, ethanol, or ethyl acetate.

7. A process in accordance with claim 1 wherein the taming agent is contacted with the catalyst prior to contacting with ethylene.

8. A process in accordance with claim 1 wherein the melt flow ratio of the polyethylene produced is in the range of from 85 to 150.

9. A process in accordance with claim 4 wherein the taming agent is present in amount sufficient to increase the melt flow ratio by at least 5 units compared to a polymer prepared under the same conditions without the taming agent.

10. A process in accordance with claim 9 wherein the taming agent is present in amount sufficient to increase the melt flow ratio by at least 8 units compared to a polymer prepared under the same conditions without the taming agent.

11. A process in accordance with claim 1 wherein the chromium content of the catalyst is greater than about 0.1 weight percent based on the total catalyst weight.

12. A process in accordance with claim 11 wherein the chromium content of the catalyst is in the range of from about 0.1 to about 10 weight percent based on the total catalyst weight.

13. A process in accordance with claim 11 wherein the amount of titanium is greater than about 0.1 weight percent based on the total catalyst weight.

14. A process in accordance with claim 13 wherein the amount of titanium is in the range of from about 0.1 to about 10 weight percent based on the total catalyst weight.

15. A process in accordance with claim 13 wherein the inorganic refractory oxide is silica.

16. A process in accordance with claim 15 where oxygen is also present.

17. A process in accordance with claim 1 wherein an alpha-olefin comonomer containing 3 to 8 carbon atoms is also polymerized.

18. A process in accordance with claim 17 wherein the comonomer is butene-1 or hexene-1 and is present in an amount in the range of from 0.01 to 10 mole percent of the total ethylene feed.

19. A process in accordance with claim 1 wherein the polymerization conditions include a temperature in the range of from 100° F. to 250° F. and a pressure in the range of from 100 and 500 psig.

20. A process in accordance with claim 19 wherein the polymerization is carried out under gas phase polymerization conditions in a fluidized bed of catalyst and polyethylene.

21. A polymerization process comprising contacting under polymerization conditions a catalyst, a taming agent, ethylene and optionally an olefin containing from 3 to 8 carbon atoms:

wherein the catalyst comprises chromium oxide, titanium oxide and an inorganic refractory oxide; and wherein the taming agent is selected from the group consisting of water, aldehydes, ketones, esters, organic acids, methanol, ethanol, n-propanol, isopropanol, butanol, amyl alcohol, hexanol and mixtures thereof.

* * * * *